United States Patent [19]

Satoh

[11] Patent Number: 4,822,218

[45] Date of Patent: Apr. 18, 1989

[54] FLUID DELIVERY DEVICE FOR A MACHINING CENTER, AND A MACHINING CENTER

[76] Inventor: Yoshikazu Satoh, 204, Kifune 1-chome, Meito-ku, Nagoya City, Aichi 465, Japan

[21] Appl. No.: 90,887

[22] Filed: Aug. 31, 1987

[51] Int. Cl.⁴ .......................................... B23Q 11/10
[52] U.S. Cl. .................... 409/136; 51/267; 408/56; 408/61
[58] Field of Search .................. 408/56, 61; 409/135, 409/136; 29/DIG. 50, DIG. 54, DIG. 63, DIG. 88, DIG. 91; 51/356, 266, 267

[56] References Cited

U.S. PATENT DOCUMENTS

| 4,557,643 | 12/1985 | Cioci | 409/136 |
| 4,573,833 | 3/1986 | Kondo | 408/61 X |

FOREIGN PATENT DOCUMENTS

| 0166407 | 1/1986 | European Pat. Off. | |
| 170899 | 2/1986 | European Pat. Off. | |
| 2400461 | 7/1974 | Fed. Rep. of Germany | |
| 2437739 | 2/1976 | Fed. Rep. of Germany | |
| 203846 | 11/1983 | Fed. Rep. of Germany | |
| 3426744 | 8/1985 | Fed. Rep. of Germany | 51/267 |
| 2537486 | 6/1984 | France | |
| 0114645 | 9/1981 | Japan | 409/136 |
| 0008273 | 1/1986 | Japan | 51/267 |
| 0565808 | 7/1977 | U.S.S.R. | 408/61 |
| 1234161 | 5/1986 | U.S.S.R. | 409/136 |
| 2144510 | 3/1985 | United Kingdom | |

Primary Examiner—Gil Weidenfeld
Assistant Examiner—Steven C. Bishop
Attorney, Agent, or Firm—Armstrong, Nikaido, Marmelstein & Kubovcik

[57] ABSTRACT

This invention relates to a machining center fluid delivery system comprising a body block to be mounted on a tool holder to be installed in a machining center and a driving source block to be mounted on the machining center, and to a machining center equipped with such a fluid delivery system. The invention assures an exact orientation of nozzles and their delivery of a machining fluid towards the machining point which is constantly shifted with the progress of machining operation, thus contributing to an extremely high performance of cutting and grinding operations.

2 Claims, 15 Drawing Sheets

FIG. 5.
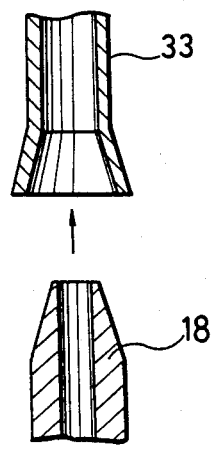
FIG. 6.
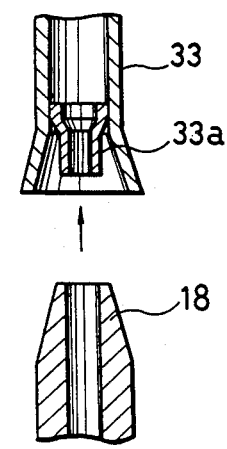
FIG. 7(a)
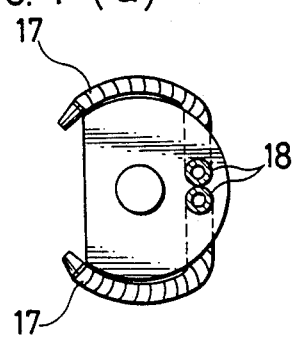
FIG. (b)
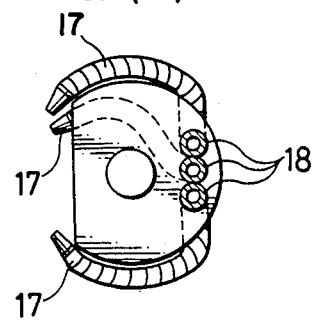

FLUID DELIVERY DEVICE FOR A MACHINING CENTER, AND A MACHINING CENTER

TECHNICAL FIELD

This invention relates to a machining center fluid delivery device to be mounted on a machining center for supplying a cooling fluid to the machining point and to a machining center equipped with said machining center fluid delivery device.

BACKGROUND ART

For a rationalization and automation of production lines, the so-called machining centers (multiple-duty machine tools) each able to perform a variety of machining operations such as milling, tapping, boring, etc. automatically and with high efficiency have been widely employed. Such a machining center generally has a positioning function for setting a workpiece in position automatically and a machining function for performing milling, tapping, boring and/or other machining work on an elected part of the workpiece, and carries as incorporated therein a variety of tools necessary for such operations as securely mounted on respective tool holders. As such, the machining center performs the intended machining as the tool required therefor is automatically selected from the battery of tools, taken out together with the tool holder as a unit, and mounted on the lower end of the spindle of the machining center.

FIG. 21 shows a machining tool and tool holder as so mounted as a unit on the machining center spindle. It is a longitudinal section view showing the spindle and associated assembly of the machining center. In the drawing, the reference numeral 1 designates a spindle for imparting a rotary motion to a tool 13 for the machining of a workpiece and the numeral 2 designates a tool holder mounted at the lower end of said spindle 1. The tool holder 2 is described below in detail. The tool holder 2 comprises a frustoconical mating member 4 complementary to a tapered inner wall 3 of said spindle 1 in proximity with its lower end, a grippable member 6 projecting in the manner of a bolt from the center of the upper surface of said mating portion 4 and engageable with a chuck member 5 disposed within said spindle 1, an arm-engaging member 8 formed on the bottom of said mating member 4 and having a groove 7 adapted to engage with a tool mounting-dismounting arm (not shown) of the machining center, and a tool coupling shaft 9 extending downwards from the center of the lower end of said arm-engaging member 8. The tool 13 is set in position at the lower end of the tool coupling shaft 9 of the tool holder 2 and is secured in position by means of a lock screw 10.

In this arrangement, the machining center performs a machining operation as follows. First, a workpiece is set on a work table (not shown) disposed under said spindle 1. The table is adapted to slide in X- and Y-directions in accordance with a pre-inputted program and positions the workpiece at the machnining start point (origin) for the workpiece. Then, the spindle 1 begins to rotate to cause the tool holder 2 and tool 13 to spin as a unit and, at the same time, said work table ascends (or the spindle 1 descends) to bring the edge or point of the tool 13 into contact with the portion of the workpiece to be machined, whereby the desired machining of the workpiece is initiated. With a constant shift of the table or the spindle 1 in accordance with the pre-inputted program, the position of contact of the workpiece with the tool point is constantly varied, thereby giving a predetermined finished shape to the workpiece. After completion of the above continuous series of operations, the pressure contact between the tool 13 and the workpiece is relieved and the machined work is taken out from the table. When a plurality of workpieces are to be machined in the same way, a new workpiece is fed onto the table as soon as the machined work is taken out and the above series of operations is performed once again so that continuous automatic machining is carried out.

Now, even in such automatic machining with a machining center, just as in the ordinary machine tool operation, there are cases in which a cutting fluid or grinding fluid must be supplied and, therefore, a fluid nozzle means for delivering such a cutting or grinding fluid is incorporated in the machining center.

However, in spite of the fact that the machining direction of the tool 13 with respect to the workpiece is determined as aforementioned by the relative position of the table carrying the workpiece and the spindle 1, the delivery of the cutting or grinding fluid is generally done from a delivery nozzle fixed in a position quite indifferent to the movements of the table and spindle 1 within the machining center. Thus, the fluid is delivered without regard to the machining direction of the tool 13 with respect to the workpiece. Therefore, whereas the effect of cooling ought to be directed mainly to the point where the most intense heat is generated in machining such as cutting, grinding, etc., that is the critical point (machining point) where the edge or point of the tool 13 enters into the workpiece, the fluid is delivered off the mark so that the generated heat of machining cannot be fully controlled with consequent problems such as serious damages to the tool 13.

Therefore, it is common practice to employ an elongated jet nozzle 150 that can be finger-controlled in the direction of delivery as illustrated in FIG. 22 and perform machining with the operator manipulating the nozzle 150 to keep up with the condition of machining. However, this system is not in alignment with the degree of convenience offered by other features of the machining center. Therefore, there has been a standing need for a machining center equipped with such a feature as ensures that the machining fluid can always be directed to the aforementioned machining point.

OBJECT OF THE INVENTION

It is an object of this invention to provide a machining center equipped with a system such that a machining fluid may be always directed to the machining point where the tool enters the workpiece.

DISCLOSURE OF THE INVENTION

For the purpose of accomplishing the above object, this invention provides, in a first aspect, a machining center fluid delivery system comprising a body block adapted to be mounted on a tool holder to be mounted on a machining center and a driving source block to be mounted on a body of said machining center, said body block comprising a body member as mounted on a tool coupling shaft of said tool holder and adapted to become freely rotatable upon mounting of the tool holder carrying said body block on the machining center fitted with said driving source block and engage with the tool holder upon dismounting of said tool holder carrying said body block from the machining center carrying said driving source block, a fluid delivery pipe extending upwardly from said body member and adapted to fit into a connecting hole provided in said driving source block upon mounting of the tool holder carrying the body block on the machining center carrying the driving source block to thereby transmit the rotary driving force from a drive source to said body member and be rendered communicable with a fluid supply passageway from the machining center side and a fluid nozzle projecting from said body member either laterally or downwardly and communicating with one end of said fluid delivery pipe so as to deliver a machining fluid to the machining point, and said driving source block being provided with a driving source for applying a rotary driving force to the body member of said body block, and, in a second aspect, a machining center equipped with a fluid delivery system comprising a body block and a driving source block, said body block being mounted on a tool holder to be mounted on the machining center and said driving source block being mounted on the body of the machining center, said body block comprising a body member as mounted on a tool coupling shaft of said tool holder and adapted to become freely rotatable upon mounting of the tool holder carrying said body block on the machining center fitted with said driving source block and engage with the tool holder upon dismounting of said tool holder carrying said body block from the machining center carrying said driving source block, a fluid delivery pipe extending upwardly from said body member and adapted to fit into a connecting hole provided in said driving source block upon mounting of the tool holder carrying the body block on the machining center carrying the driving source block to thereby transmit the rotary driving force from a drive source to said body member and be rendered communicable with a fluid supply passageway from the machining center side and a fluid nozzle projecting from said body member either laterally or downwardly and communicating with one end of said fluid delivery pipe so as to deliver a machining fluid to the machining point, and said driving source block being provided with a driving source for applying a rotary driving force to the body member of said body block.

EFFECT OF THE INVENTION

The machining center fluid delivery device according that it delivers a machining fluid exactly towards the machining point at all times through mere attachment of a few additional components to the hitherto-available machining center and associated tool holder. Therefore, the machining operation with the machining center equipped with the fluid delivery device according to this invention features a minimum of heat buildup and an adequate removal of chips or grounds thanks to the oriented delivery of the machining fluid to the machining point which is the point of contact between the workpiece and the tool, thus offering a high-performance machining effect which has never been materialized in the past. Furthermore, the damage and wear of the tool is minimized and the machining efficiency is enhanced

BRIEF DESCRIPTION OF THE INVENTION

Figure 3:
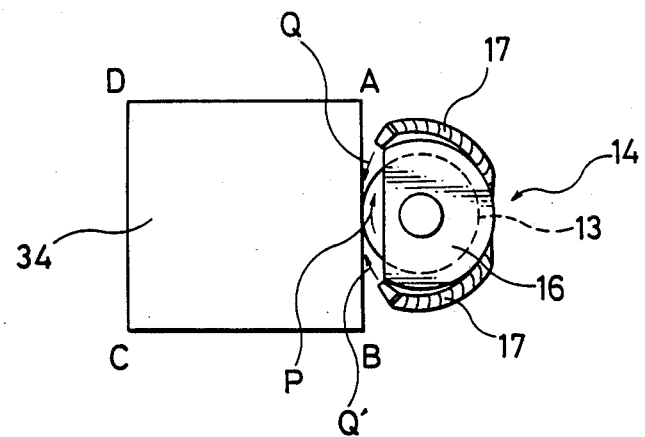
Figure 4:
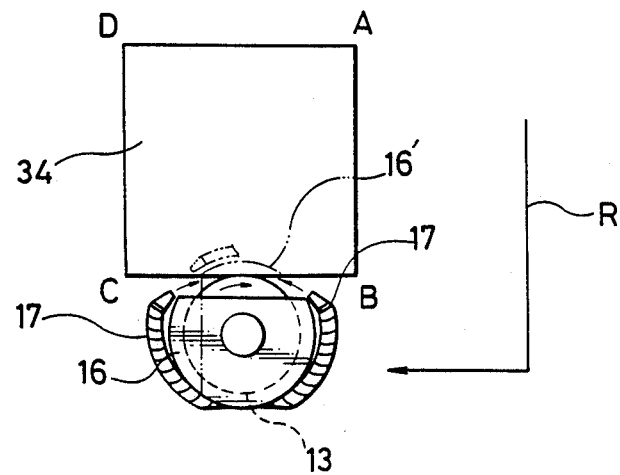
Figure 8:
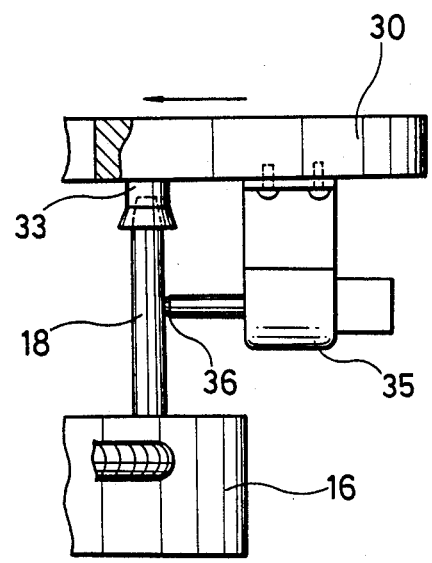
Figure 9:
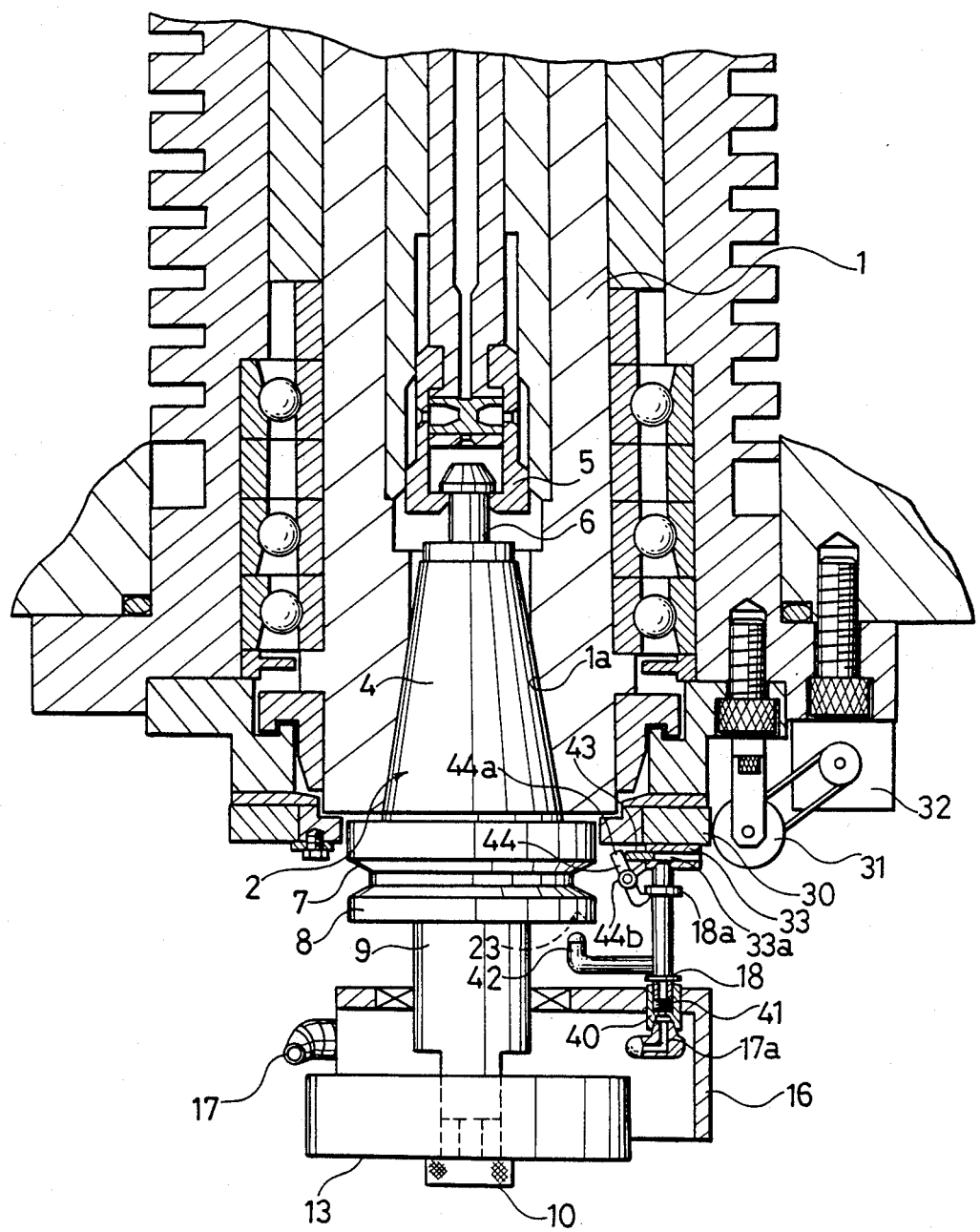
Figure 10:
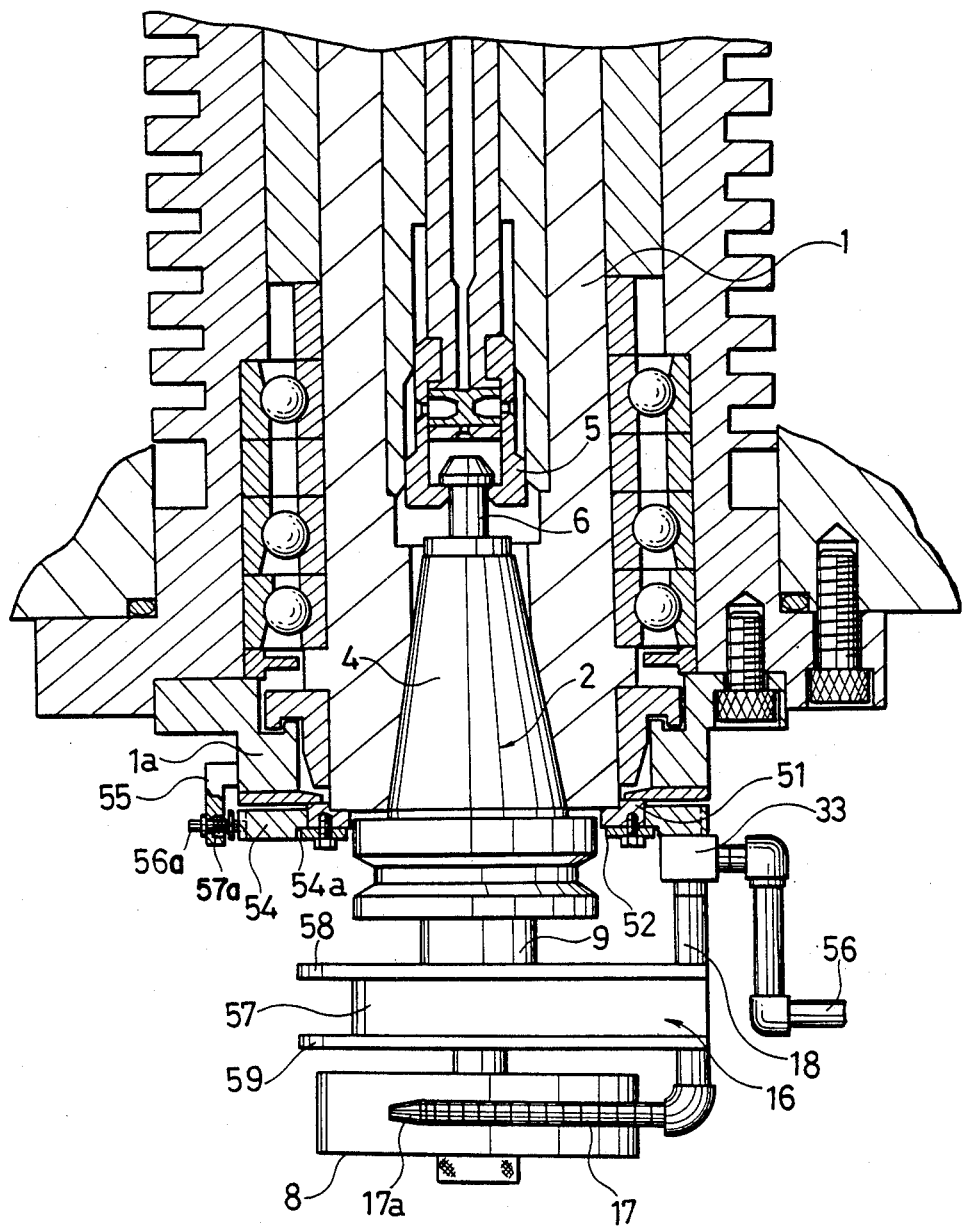
Figure 11:
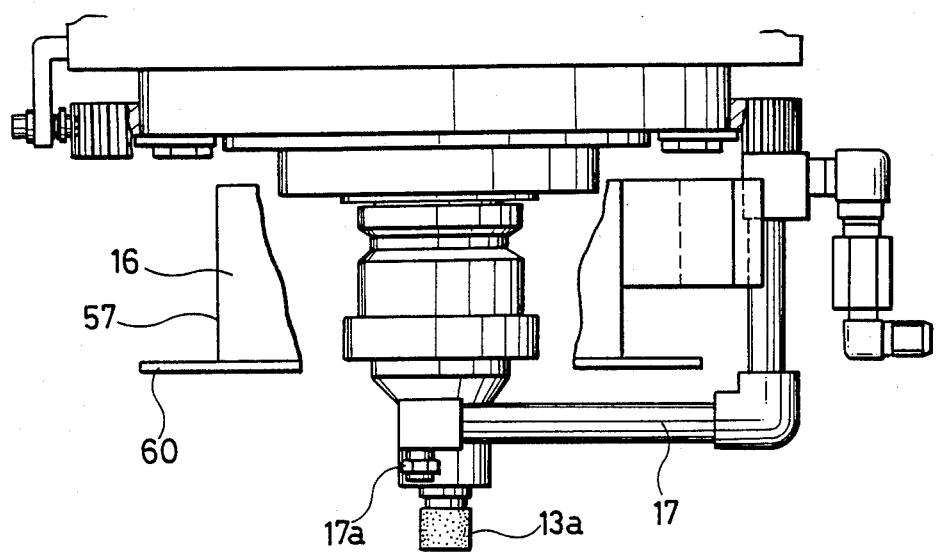
Figure 12:
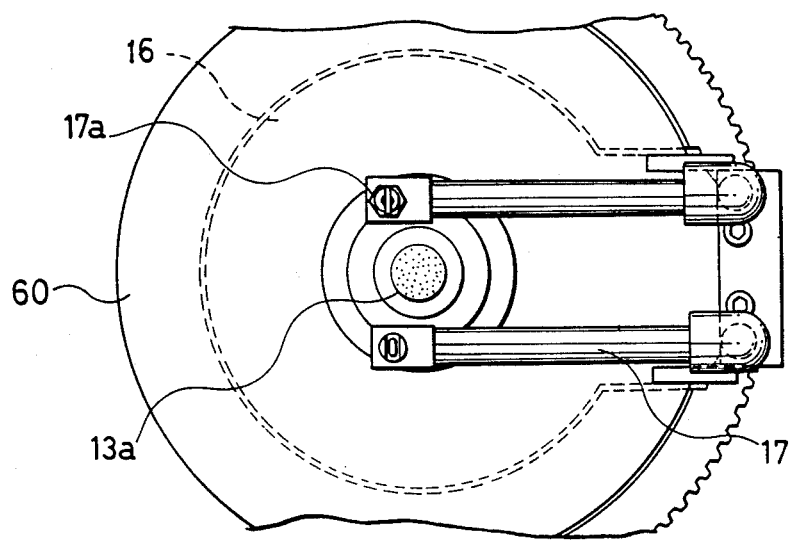
Figure 13:
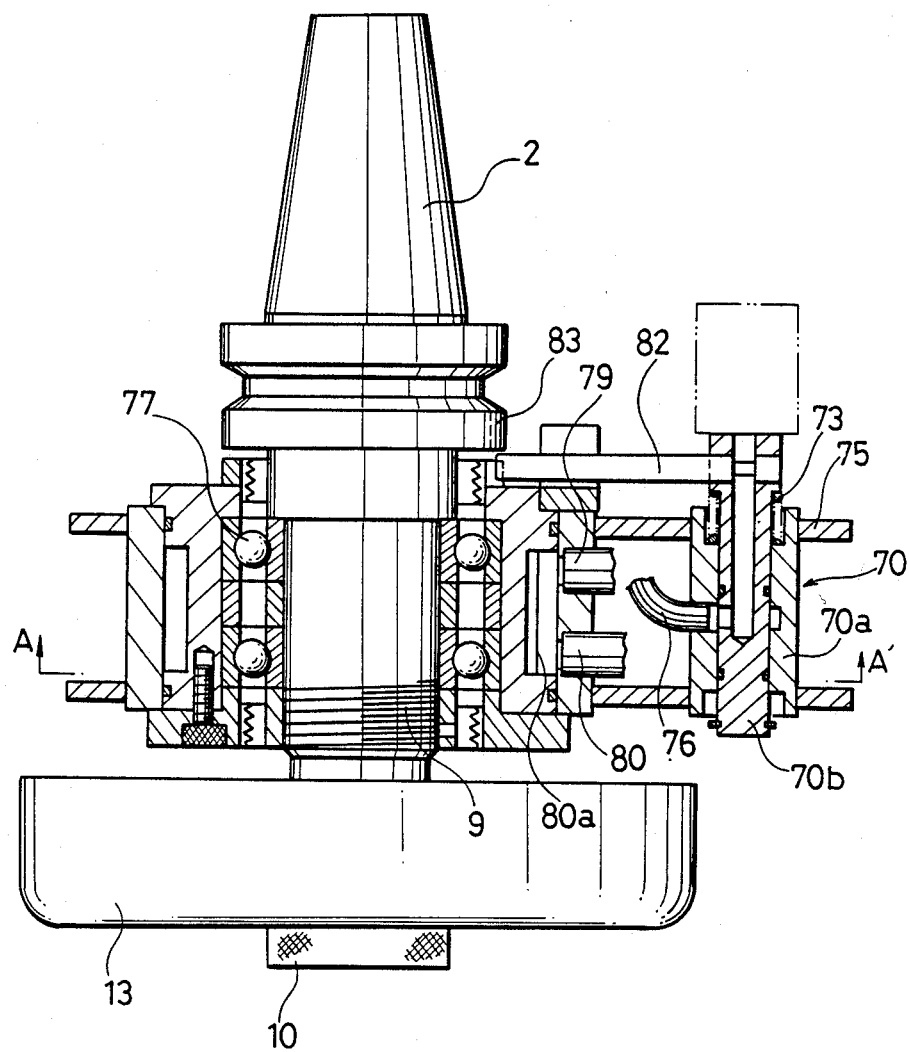
Figure 14:
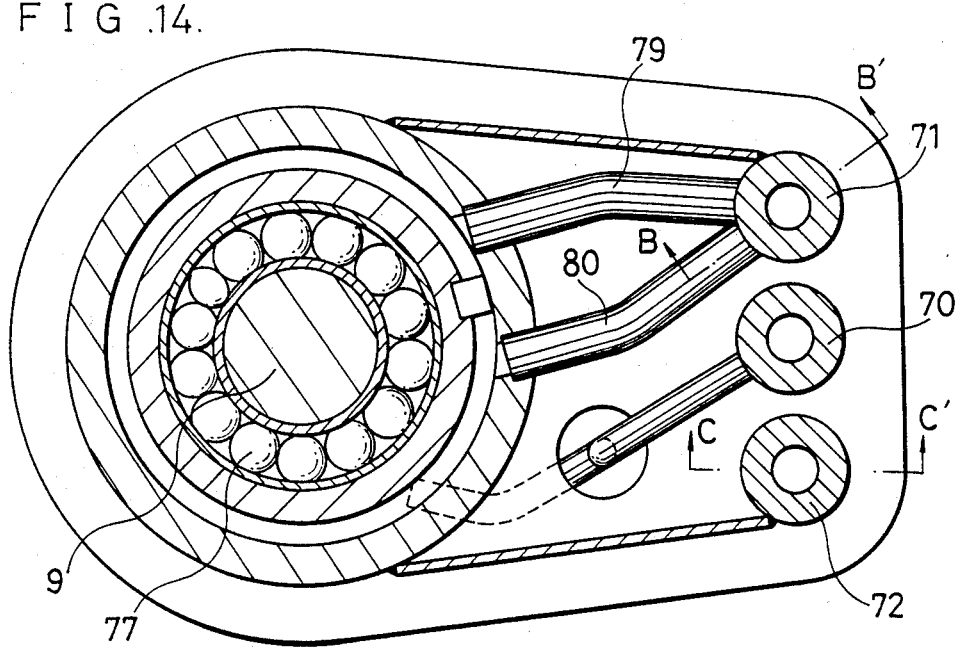
Figure 15:
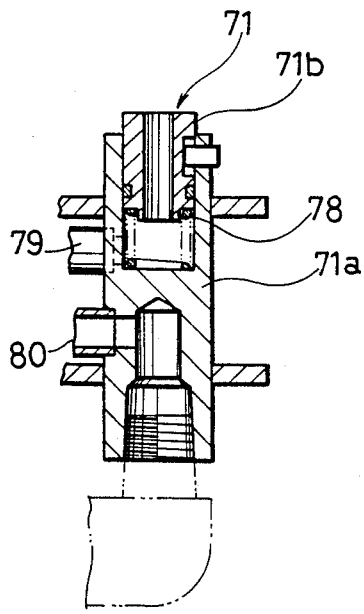
Figure 16:
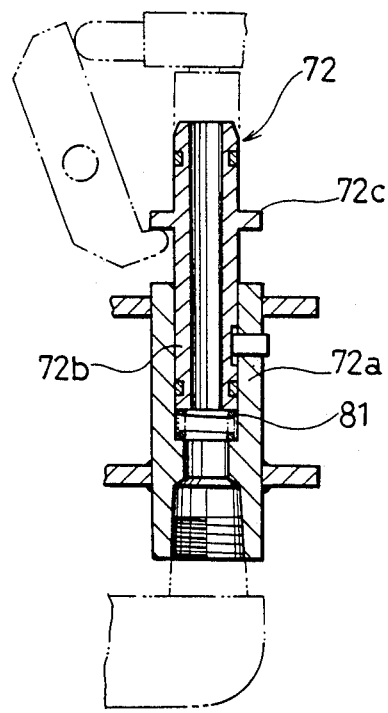
Figure 17A:
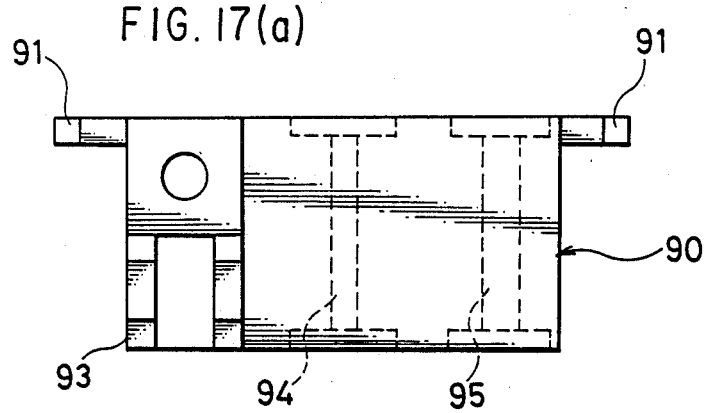
Figure 17B:
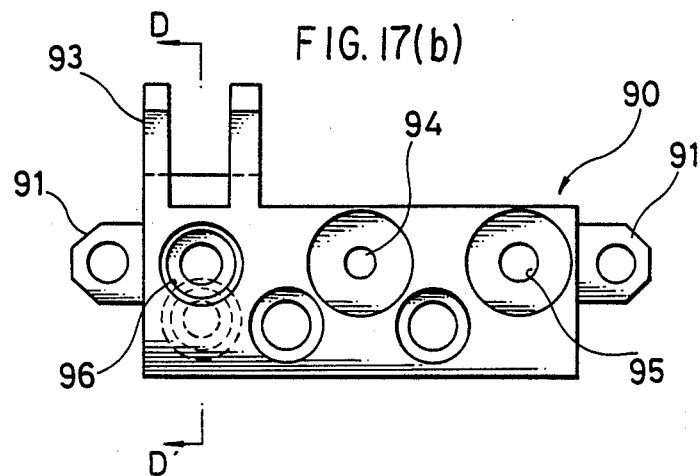
Figure 18:
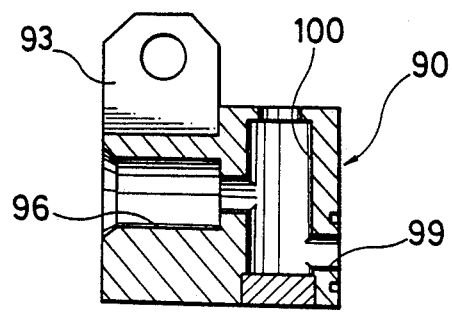
Figure 19:
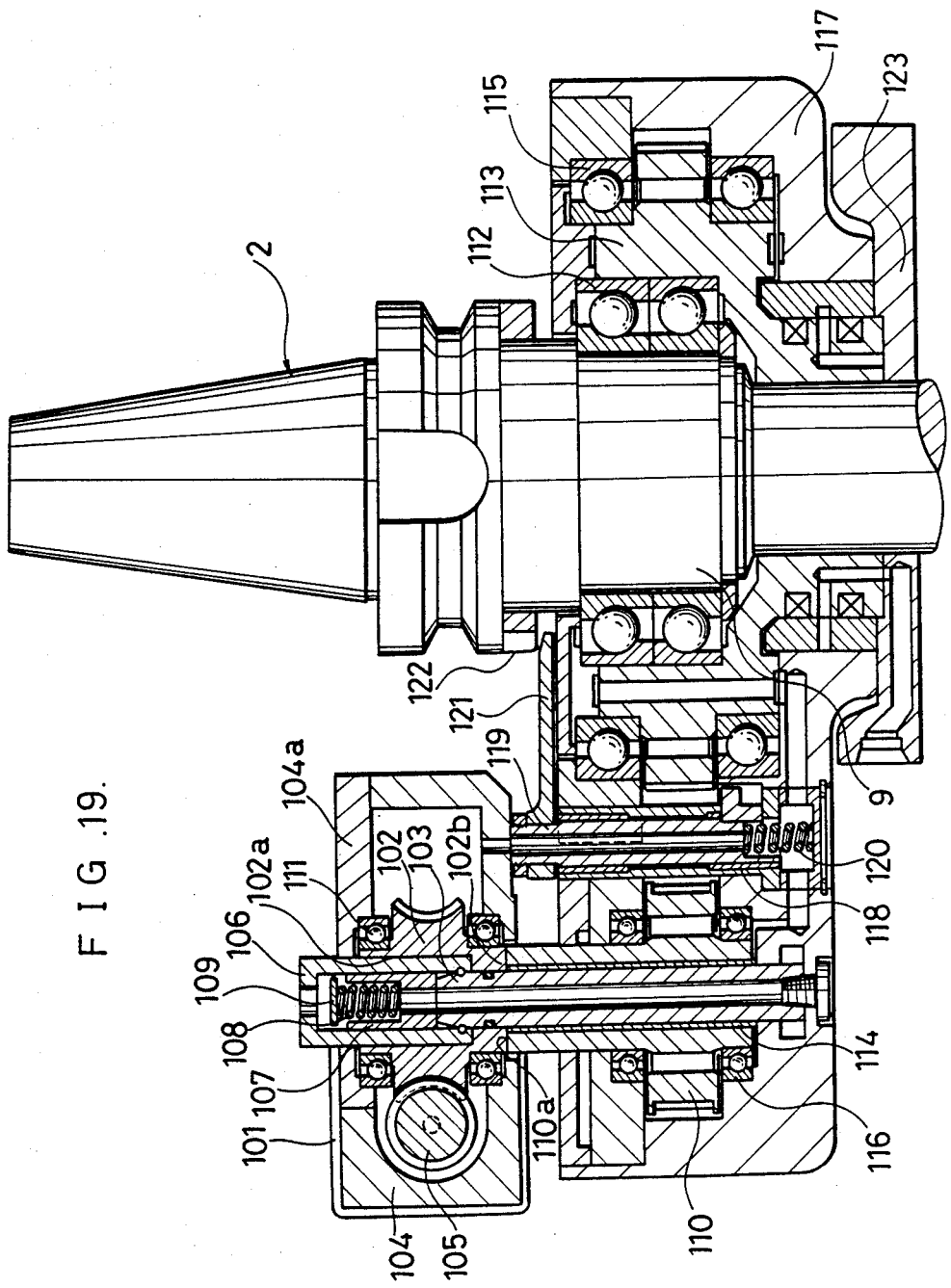
Figure 20:
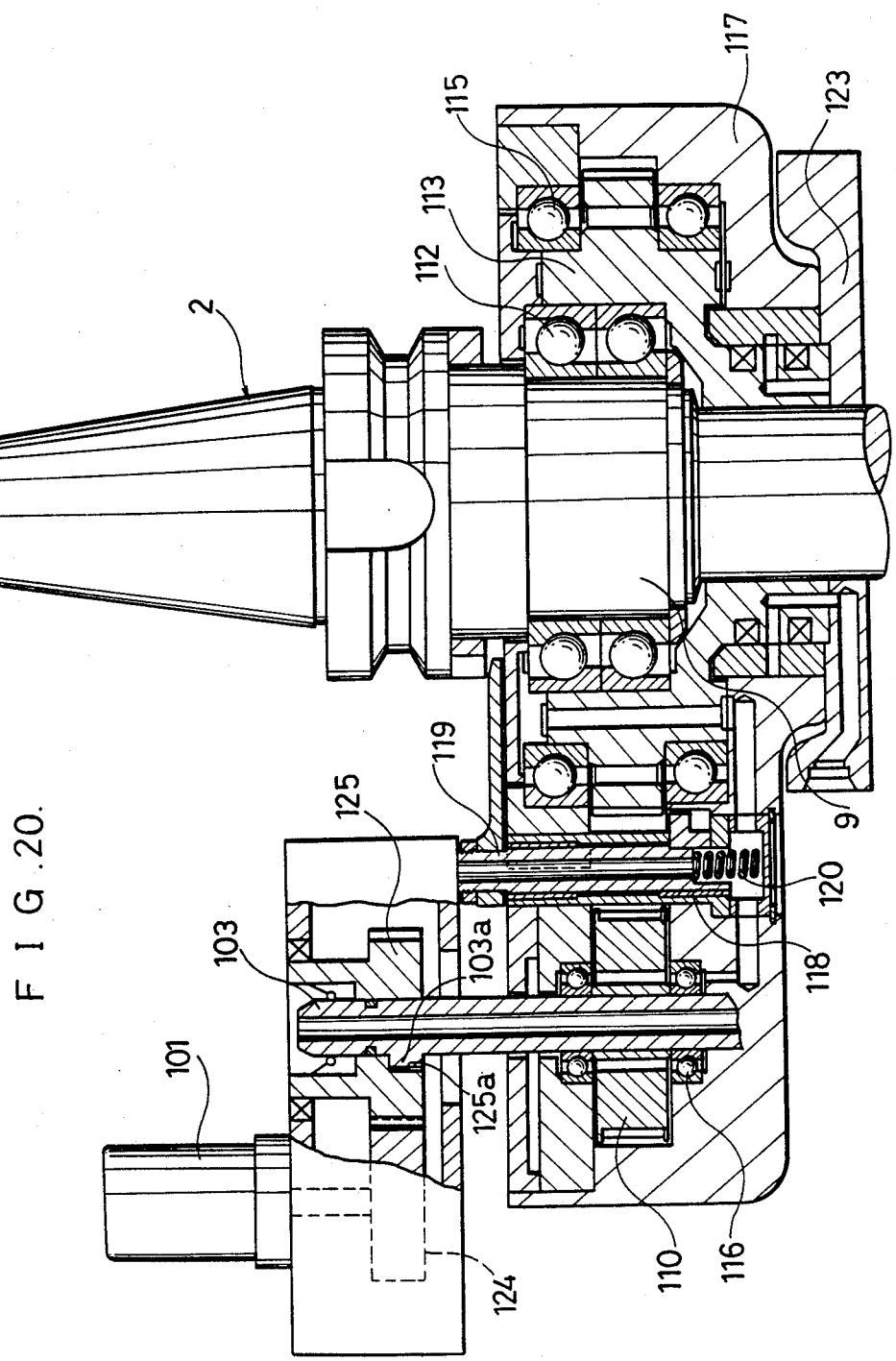
Figure 21:
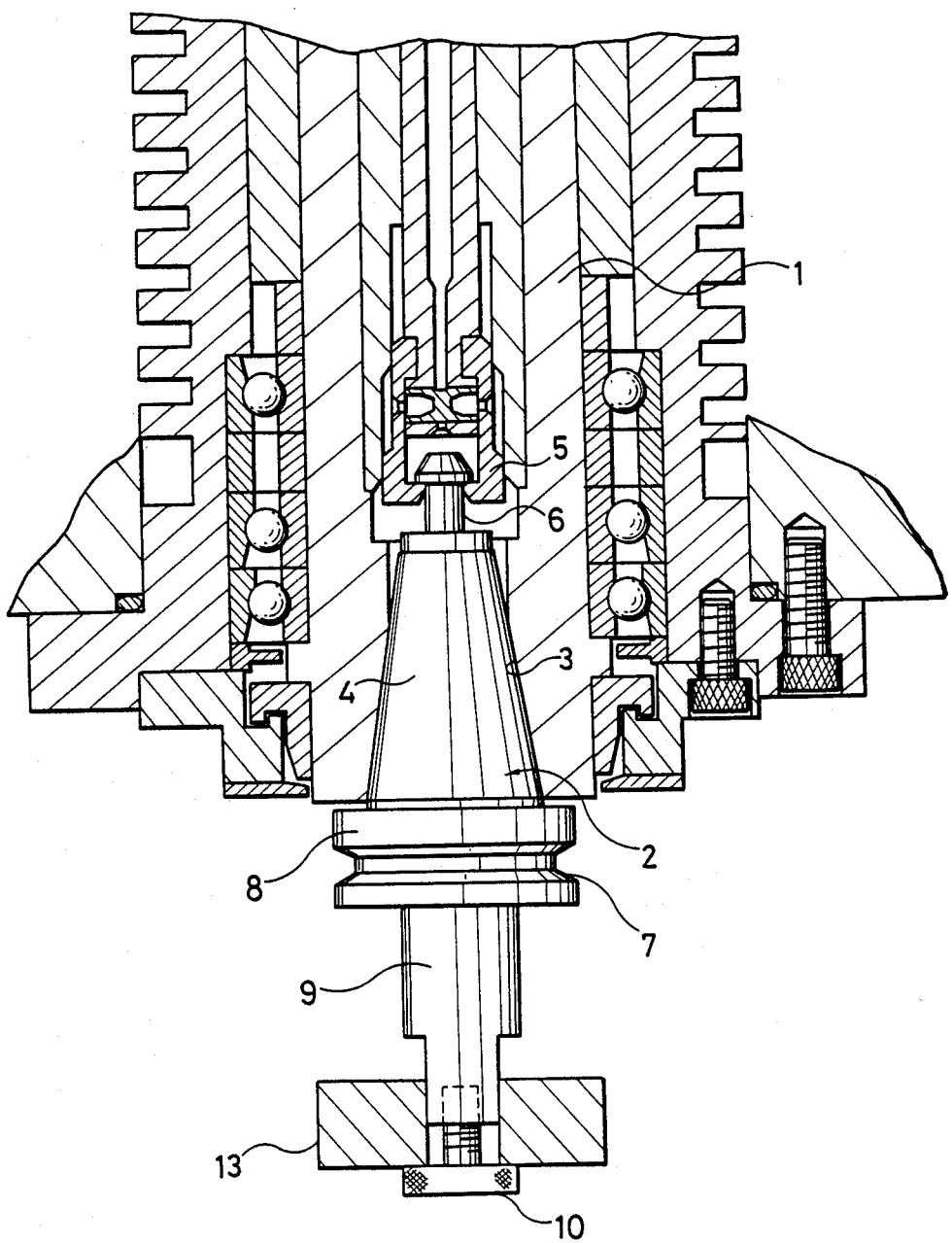
Figure 22:
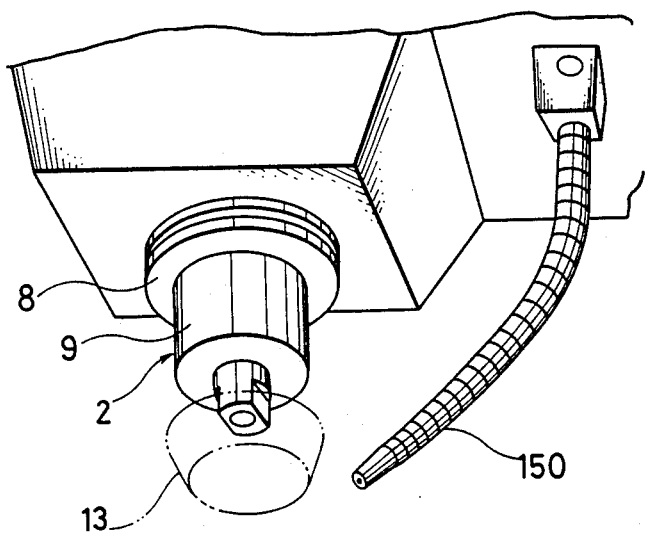

FIG. 3 and FIG. 4 each is a schematic view illustrating the machining operation using an embodiment of this invention;

FIG. 5 is a schematic view illustrating the end connection of a fluid delivery pipe according to this invention;

FIG. 6 is a schematic view illustrating a modification of the same;

FIGS. 7(a) and 7(b) are schematic views illustrating jet nozzles and a modified fluid delivery pipe according to this invention;

FIG. 8 is a schematic view showing a modified embodiment fitted with a fluid delivery pipe in accordance with this invention;

FIG. 9 is a longitudinal section view showing another embodiment of this invention;

FIG. 10 is a longitudinal section view showing still another embodiment of this invention;

FIG. 11 is a partial longitudinal section view showing a modification thereof;

FIG. 12 is a bottom view thereof;

FIG. 13 is a longitudinal section view showing another yet embodiment of this invention;

FIG. 14 is a sectional elevation view taken on the line A-A' of FIG. 13;

FIG. 15 is a sectional elevation view taken on the line B-B' of FIG. 14;

FIG. 16 is a sectional elevation view taken on the line C-C' of FIG. 14;

FIG. 17(a) is a plan view showing an example of the coupling block used with the embodiment of FIG. 13;

FIG. 17(b) is a front view thereof;

FIG. 18 is a sectional elevation view taken on the line D-D' of FIG. 17(b);

FIG. 19 is a longitudinal elevation view illustrating a still further embodiment of this invention;

FIG. 20 is a longitudinal elevation view showing a modification thereof;

FIG. 21 is a longitudinal section view showing the conventional machining center; and FIG. 22 is a partial perspective view showing the fluid delivery system of the conventional machining center.

BEST MODE FOR CARRYING OUT THE INVENTION

This invention will be described in detail with reference to embodiments.

Figure 1:
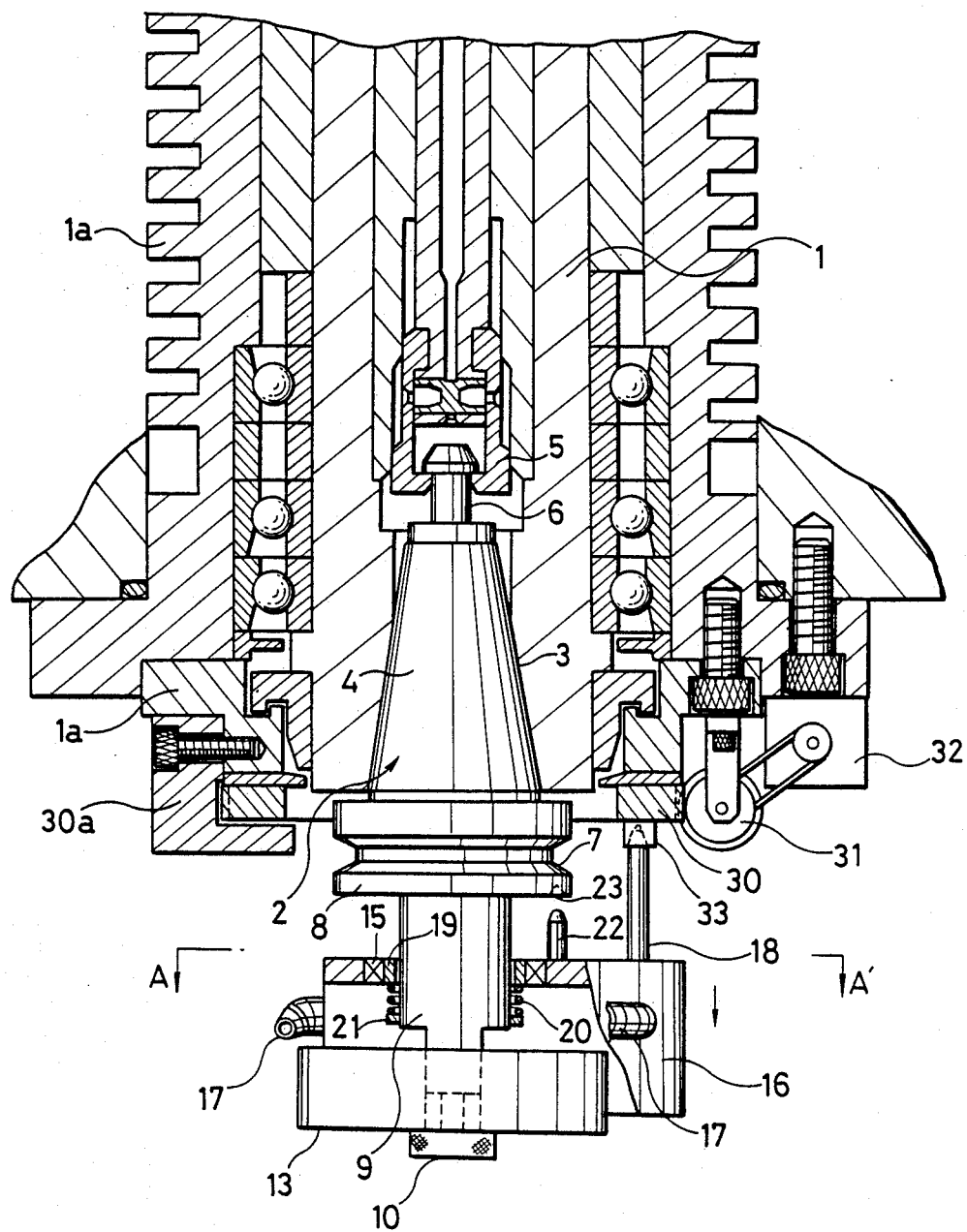
FIG. 1 is a longitudinal section view showing an embodiment of this invention.

FIG. 1 shows an embodiment of this invention. Thus, this machining center is provided with a machining center fluid delivery system which comprises a driving source block as attached to the machining center body and a body block as attached to a tool holder 2, and as the tool holder 2 carrying said body block is mounted on the machining center equipped with said driving source block as illustrated, the two blocks are integrated into a unit which exhibits a fluid delivery function which is not shared by the conventional fluid supply means. Incidentally, the machining center thus provided with the machining center fluid delivery system is similar to the conventional machining center (FIG. 21) and, therefore, the like numerals are used to denote the like parts of the two devices. It should also be noticed that the machining tool (13) is a grinding wheel in this case.

Figure 2:
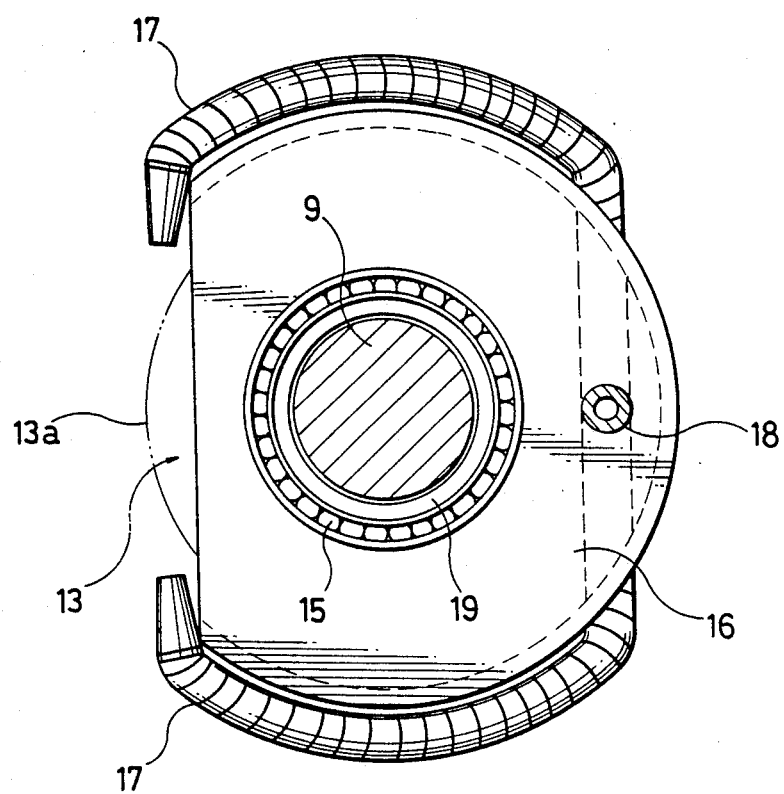
FIG. 2 is a sectional elevation view taken on the line A-A' of FIG. 1.

First, the driving source block of this fluid delivery system is explained. The driving source block mentioned above comprises, in combination, a ring gear 30 as mounted at the lower end surface of an outer cylinder 1a of a spindle 1 of the machining center and rotatable along the circumference thereof, a pinion gear 31 which is in mesh with said ring gear 30 and adapted to drive it in a circumferential direction, and a pulse motor 32, such as a stepping motor, which imparts an intermittent rotary motion to said pinion gear 31 and is capable of rotating said ring gear 30 quite independently of the driving system for the spindle 1. Indicated at 30a is a guide ring which holds said ring gear 30 rotatably on the lower end surface of said outer cylinder 1a of spindle 1, with a cutout in the position corresponding to the position of engagement between the ring gear 30 and pinion gear 31. Mounted in a position on the lower end surface of said ring gear 30 is a coupling block 33 through which a fluid delivery tubing (not shown) is extending so as to supply a grinding fluid or the like from a fluid supply passageway disposed within the machining center. Then, the body block of this fluid delivery system is explained. This body block essentially comprises a body member 16 rotatably mounted on a tool coupling shaft 9 of the tool holder 2 through a bearing 15, a fluid delivery pipe 18 installed as protruding upright from the body member 16, and jet nozzles 17 extending circumferentially from the lateral side of said body member 16 and discharging downwards. Thus, as shown in FIG. 2 (the A–A' section of FIG. 1), this body member 16 is configured as a top-covered hollow cylinder with a partial cutout of the lateral side, and a couple of jet nozzles 17 which are conjoined at a common base are disposed extending along the outer periphery of the body member 16 in such a manner that they discharge down (toward the machining point) from the respective edges of said cutout portion. The fluid delivery pipe 18 is such that it communicates with said base of jet nozzles 17 at its lower end and fits removably with the coupling block 33 of the driving source block mounted on the machining center at its upper end (FIG. 1). Within said body member 16, a slider 19 is loosely mounted on the tool coupling shaft 9 which carries the body member 16 and the whole body member 16 is upwardly pre-energized by the biasing force of a compression spring 20 which bears on a spring retainer 21 fixedly mounted coaxially with said slider. By this upward pre-energization, said fluid delivery pipe 18 fits firmly into the coupling block 33 to assure a fluid-tight connection.

The reference numeral 22 represents a stopper whose tip has been processed into a semi-spherical configuration. When the body member 16 carrying the tool holder 2 is removed from the spindle 1 of the machining center, it fits into a conical groove 23 formed in an appropriate position on the lower end surface of the arm-engaging portion 8 of the tool holder 2 so as to set and lock the fluid delivery pipe 18 in an appropriate position. The appropriate position mentioned just above means the position that when the tool holder 2 is mounted, said fluid delivery pipe 18 may automatically fit with the coupling block 33 carried by the ring gear 30 of the machining center. In this connection, it is necessary that the length of the fluid delivery pipe 18 on fitting be such that, with the tool holder 2 having been mounted on the machining center, the stopper 22 will not engage the conical groove 23. Thus, at the start of grinding operation following the mounting of the tool holder 2, the body member 16 must be able to spin in a circumferential direction and stop as necessary in response to the movement of the ring gear disposed on the lower end surface of the outer cylinder 1a of the machining center spindle 1 but this is disabled if said stopper 22 has been engaged by said groove 23. The fluid delivery pipe 18 and coupling block 33 thus integrated not only serves as a passageway for the machining fluid but also serves to transmit the rotation of the ring gear 30 on the machining center side to the body member 16. The driving force for rotation of the ring gear is supplied by a pulse motor 32 through a pinion gear 31. The pulse motor is driven by a separate control means. Such control means may typically comprises in combination a reader unit adapted to read the position of the machining point and output a signal, a computational operation unit adapted to compute the angle of rotation of the body member 16 corresponding to the direction of discharge of the jet nozzles 17 toward the machining point and output a signal, and a current supply unit adapted to energize said pulse motor. In such a combination, said reader unit reads the movement of the work table which transfers the workpiece to be machined, for example on the X-Y coordinates, exploiting the characteristic of the machining center that the machining point is shifted in accordance with the movement of the work table. The readout is performed using the position of the table at the start of machining as the origin (0, 0) and proceeding continuously in such a manner that the position after $t_1$ seconds is read as $(x_1, y_1)$, the position after $t_2$ seconds as $(x_2, y_2)$, and so on. The data signal obtained by said reader unit is inputted into the computational operation unit such as a computer. The computational operation unit receiving said data signal computes the corresponding angle of rotation of the body member 16 from the displacement of the table at $\Delta t$ and outputs a signal. However, as the computation formula for computing the angle of rotation of the body member 16 from the displacement of the table varies with the shape of the workpiece to be ground, it is necessary to input an appropriate formula in the presetting of the machining center or select an appropriate one from among a plurality of pre-inputted formulas. Based on the output from said computational operation unit, a signal is fed to said pulse motor 32 which, thereupon, drives the ring gear 30 through a necessary angle.

The grinding operation by the machining center equipped with the above-described fluid delivery device is carried out as follows. Thus, the tool holder 2 is automatically mounted on the machining center. In this condition, as mentioned above, the fluid delivery pipe 18 projecting from the body member 16 of the fluid delivery device mounted on the tool holder 2 side engages the coupling block 33 on the machining center side, whereby as shown by the arrowmark in FIG. 1, the body member 16 is depressed to release the engagement of the stopper 22 with the groove 23. Therefore, the body member 16 is integrated with the machining center ring gear 30 via the fluid delivery pipe 18.

Grinding is started in this condition.

The positioning and shift of the workpiece to be ground are carried out in the same manner as in the conventional machining center. However, because of the installation of the above-described fluid delivery device, the delivery of the grinding fluid is not performed from a fixed location as in the conventional machining center but is performed from the jet nozzles 17 secured to the body member 16 which spins and stops in accordance with the shift of the machining point, with the result that the grinding fluid is always exactly directed to the machining point. This is the most outstanding feature of this invention.

The fluid delivery system will now be described in detail. FIG. 3 is a schematic plan view for explaining the fluid delivery system applicable to the grinding of the four sides of a workpiece 34 having a square two-dimensional configuration having apices A, B, C and D. A grinding wheel 13 is given a rotational force in the direction of the arrowmark P from the overhead spindle (not shown) and, as illustrated, grinding is underway from apex A towards apex B of the workpiece 34. Since the delivery of the fluid from the jet nozzles 17 is directed towards the machining point as indicated by arrowmarks Q, Q', the buildup of heat at the machining point is suppressed and, at the same time, the removal of grounds is effected efficiently so that a neat ground surface can be obtained. Then, grinding takes place from apex B towards apex C of the workpiece 34. This condition is illustrated in FIG. 4. The relative movement of the grinding wheel 13 with respect to the workpiece 34 can be shown by the arrowmark R. On the other hand, the position of the body member 16 of the fluid delivery device would be such as represented by the two dots-chain line 16' if it simply follows the movement of the grinding wheel 13. Therefore, in order that the fluid may be delivered exactly to the machining point, the body member 16 must be rotated through 90 degrees circumferentially. This 90°-rotation of the body member 16 is effected in association with the movement of the ring gear 30 (FIG. 1) connected through the fluid delivery pipe 18 projecting upwards from the body member 16. As mentioned hereinbefore, driving of said ring gear 30 is performed by a machining point shift control system built into the machining center. Therefore, in the grinding operation between apices B and C, too, the delivery of the grinding fluid is directed to the machining point without fail just as shown in FIG. 3. The same is true, i.e. the fluid is delivered towards the machining point, of grinding between apices C and D and that between apices D and A as well.

Thus, in the grinding operation by the machining center equipped with the machining center fluid delivery system in accordance with this invention, the machining fluid is always directed toward the machining point by the movement of the jet nozzles 17 which is associated with the shift of the machining point.

In FIG. 5, the connection to the coupling block 33 is shown to be formed by a tapered tip of the fluid delivery pipe 18 and a downwardly flared tip opening of the coupling block 33 for ease of engagement. The relative geometry of the connection may be reversed.

When the fluid is delivered at elevated pressure, the fluid may leak out from the connection to cause separation of the two members. Therefore, as shown in FIG. 6, a rubber gasket or packing 33a may be installed rigidly on the inside wall of the opening in the coupling block 33 so that the tip of the fluid delivery pipe will fit into the clearance between the rubber packing 33a and the inside wall of the coupling block 33. With such an arrangement, even the high-pressure fluid delivery does not cause such a separation as the rubber packing 33a under fluid pressure pushes the inside wall of the connection outwardly from inside to maintain an intimate seal between the two members.

Further, in the above grinding operation, the workpiece to be ground need not be a square work such as the one described but may be of any desired shape, e.g. polygonal, namely hexagonal, octagonal, etc., circular, cam-like or otherwise specially configured. For it is sufficient to transform the input control formula for the machining point control system in the stage of presetting the machining center.

The tool to be mounted on the tool holder 2 is not limited to the grinding wheel 13 mentioned hereinbefore but may be selected from among the variety of tools such as a milling cutter, drill, and so on which are usually incorporated in a machining center so that various machining operations can be performed according to the selected tools. However, since the most outstanding advantage of the fluid delivery device of this invention lies in that the fluid can be selectively delivered to the machining point throughout the operation, it seems optimal to use the device for grinding operations.

Further, in the above-described fluid delivery system, it is possible to install two (a) or three (b) fluid delivery pipes 18 and provide a larger number of jet nozzles 17 as illustrated in FIG. 7. By so doing, more delicate fluid delivery can be carried out using a high-pressure fluid and a low-pressure fluid in a suitable combination.

Moreover, in the above embodiment, the fluid delivery pipe 18 which transmits the rotational force of the ring gear 30 to the body member 16 bears the above rotation at its top end (the point of connection to the coupling block) with the result that the pipe 18 is subjected to a load in the direction of the above rotation and may tend to be damaged. Therefore, as shown in FIG. 8, it may be so arranged that a cylinder 35 is disposed in a position opposite to the direction of rotation of the ring gear 30 with respect to the fluid delivery pipe 18 so that as the ring gear 30 begins to spin in the direction of the arrowmark, the tip 36 of the piston rod of said cylinder 35 presses the exterior wall surface of said fluid delivery pipe. FIG. 9 shows another embodiment of this invention.

Whereas the body member 16 as a whole is upwardly pre-energized in the fluid delivery system shown in FIG. 1, only the fluid delivery pipe 18 is pre-energized in this embodiment. Otherwise the construction of this embodiment is similar to that of the embodiment of FIG. 1 and, therefore, the like parts are designated by the like numerals.

Thus, this fluid delivery pipe 18 communicates with an inlet 17a of said jet nozzle 17 at its lower end through a sleeve 40 and is formed with a flange 18a towards its upper end. The said sleeve 40 is secured in position in a hole drilled through the top wall of the body member 16 and has a bore which increases in diameter in the upper portion thereof, with a compression spring 41 installed on the step formed by said bore. Therefore, the fluid delivery pipe 18 is kept biased upwards by the spring force of said compression spring 41 and is able to slide up and down within the sleeve 40. The lower side of said sleeve 40 accepts the inlet 17a of said jet nozzle 17 so that free communication is established between the fluid delivery pipe 18 and the jet nozzle 17. The reference numeral 42 represents a stopper integrated with the fluid delivery pipe 18, which performs the same function as the stopper 22 shown in FIG. 1, that is to say the function of securing the body member 16 upon dismounting of the tool holder 2 from the machining center.

The coupling block 33 which connects said fluid delivery pipe 18 to the ring gear 30 on the driving source block side has a fluid delivery tube (not shown) running therethrough and a piston 43 whose tip projects externally of the fluid delivery pipe 18 is slidably installed in the passageway 33a. As the grinding fluid or the like is supplied to the above passageway, the piston 43 projects farther outwards to press an upper end 44a of a clamp 44 mounted on the fluid delivery pipe 18. And the clamp 44 rotates about an axis of rotation 44b to push up the flange 18a of the fluid delivery pipe 18 and thereby reinforce the engagement between the fluid delivery pipe 18 and the coupling block 33. In this arrangement, the higher the fluid pressure is, the greater is the reinforcement of the connection by the clamp 44 so that the leakage of fluid is reduced and fluid delivery at a higher pressure can be effected.

FIG. 10 shows a still another embodiment of the present invention.

This fluid delivery device is characterized in that the driving source block is not equipped with a motor or the like so that the body block is manually driven.

In the drawing, the reference numeral 51 represents a ring-shaped guide which is rigidly mounted coaxially with the machining center spindle 1 at the lower end of the outer cylinder 1a of the spindle 1. Indicated at 52 is a thin support ring having an outer diameter slightly larger than that of said ring-shaped guide 51 as rigidly mounted on the lower surface of said ring-shaped guide 51. The reference numeral 54 represents a ring gear which is cut away in its lower portion along its inner circumferential surface to form a step or land 54a and the inner circumferential surface of said ring gear 54 is rotatably held in slidable contact with the outer circumferential surface of the ring-shaped guide 51 while said step 54a is also held in slidable contact with the upper surface of said support ring 52. And the lower surface of said ring gear 54 is provided with an angular scale. Moreover, the stationary part of the machining center corresponding to the reference graduation on this angular scale carries an identification mark. On the other hand, a pin 56a supported by a bracket 55 secured to the outer cylinder 1a on the machining center side projects into a space between teeth on the outer circumferential surface of said ring gear 54. The above pin 56a is caused to bias the ring gear 54 at all times by the spring force of a compression spring 57a installed as illustrated but as the pin 56a is pulled with fingers as indicated by the arrowmark, the above biasing force is relieved to disengage the pin 56a from the ring gear 54. Therefore, one may set and lock the ring gear in any desired position by the steps of pulling the pin 56a out of engagement with the ring gear 54, rotating the ring gear 54 manually through the desired angle while viewing the angular scale on the lower surface of the ring gear 54, and stop pulling the pin 56a to allow it to re-engage the ring gear 54 between its teeth.

A coupling block 33 like the one shown in FIG. 1 is rigidly secured to the lower surface of said ring gear 54 to provide an integral unit together with the body block mounted on the tool holder 2 side.

This body block is characterized in that the body member 16 is equipped with a takeup means 57 for taking up the fluid delivery tube 56 connected to the coupling block 33. This takeup means 57 is formed by flanges 58 and 59 which are affixed to the upper and lower end surfaces of the body member 16. Thus, when the ring gear 54 is rotated as described above, the fluid delivery tube 56 connected to the coupling block 33 revolving together with the ring gear 54 may hung down depending on the angle of rotation. Therefore, the takeup means is adapted to take up the fluid delivery tube 56 to cancel the slack and thereby protect the fluid delivery tube against contacting the tool 13 and being damaged.

With this fluid delivery system, the direction of fluid delivery can be manually controlled to follow up with the constantly changing machining point without resort to a control mechanism for delicate control of the direction of fluid delivery.

FIG. 11 and FIG. 12 (the bottom view of FIG. 11) show a modification of the preceding embodiment. Thus, this fluid delivery device is used when a small-diameter tool 13a is employed. The jet nozzle 17 is not arcuate but straight and its discharge openings 17a are oriented towards the machining point in the manner of flanking the tool 13a. Moreover, the body member 16 is large in longitudinal thickness and a flange 60 forming the takeup means 57 is provided only on the underside. Other structural features, operation and effects of this modified embodiment are similar to those of the preceding embodiment.

It should be understood that the body block having said takeup means 57 is not limited to the manual type driving source block shown n FIG. 10 but a combination with an automatic driving source block such as shown in FIG. 1 and FIG. 9 may be employed as well.

FIG. 13 shows a still another embodiment of this invention. However, this fluid delivery system is distinct only in the construction of the body block and the driving source block may be similar to that shown in FIG. 1. Therefore, the machining center and the driving source block mounted thereon are not shown.

Thus, as shown in FIG. 14 which is a view taken on the A-A' line, this body block has an air inlet pipe 70, a low-pressure coolant inlet pipe 71 and a high-pressure coolant inlet pipe 72, or a total of 3 pipes.

The air pipe 70 mentioned above comprises an outer cylinder 70a secured rigidly to the body member 75 and an inner cylinder 70b which slides up and down along the inner circumferential surface of the outer cylinder 70a under the influence of a compression spring 73, and communicates with a bearing 77 interposed between the body member 75 and the tool holder 2 through a connecting pipe 76 and a passageway (not shown) in the body member 75. Therefore, as air is injected at grinding, the bearing 77 is supplied with pressurized air so as to prevent infiltration of grounds or cuttings into the bearing 77 and consequent interference with smooth rotation of the body block.

Moreover, as shown in FIG. 15 (a section view taken on the line B-B' of FIG. 14), said low-pressure coolant inlet pipe 71 also has a double structure consisting of an outer cylinder 71a and an inner cylinder 71b, with the inner cylinder 71b being vertically slidable along the inner circumferential surface of the outer cylinder 71a under the influence of a compression spring 78. The low-pressure coolant flows from the inner cylinder 71b to a connecting pipe 79 to a space 80a formed around the bearing 77 to a connecting pipe 80 to the lower end of the outer cylinder 71a. The lower end of the outer cylinder 71a of the above low-pressure coolant inlet pipe 71 is provided with a coupling as indicated by the two dots-chain line for connection to the jet nozzles 17 (FIG. 10). Therefore, as a low-pressure coolant is introduced in grinding operation, the coolant flows into the space 80a around the bearing 77 and is then discharged to the machining point so that the heat generated around the bearing 77 due to the friction of rotation is quenched by said coolant to extend the useful life of the component parts.

Furthermore, as shown in FIG. 16 (a sectional view taken on the line C–C' of FIG. 1), said high-pressure coolant delivery nozzles 72 is also a double structure consisting of an outer cylinder 72a and an inner cylinder 72b, with the inner cylinder 72b being vertically slidable along the inner circumferential surface of the outer cylinder 72a under the influence of a compression spring 81. The lower end of said high-pressure coolant inlet pipe 72 is provided with a coupling as indicated by the two dots-chain line for connection to the jet nozzles 17. The outer periphery of the inner cylinder 72b of said high-pressure coolant inlet pipe 72 is provided with a flange 72c so that when the high-pressure coolant inlet pipe 72 fits with the coupling block 33 on the driving source block side to introduce the high-pressure coolant, a clamp 44 is actuated as indicated by the two dots-chain line to reinforce the fitting connection. This is similar to the case in FIG. 9.

Referring, now, to FIG. 13, the reference numeral 82 represents a member which performs the same function as the stopper 42 in FIG. 9. Thus, upon dismounting from the machining center, it engages a cutout portion 83 of the tool holder 2 under the upward biasing force of a compression spring 73 to position the body block.

Coupling between the above body block and the driving source block shown in FIG. 9, for instance, is preferably by means of a coupling block 90 such as the one shown in FIG. 17. FIG. 17(a) is a plan view and FIG. 17(b) is a front elevation view. This coupling block 90 is secured rigidly to the driving source block by applying mounting lobes 91 to the ring gear 30 (FIG. 9) and locking them in position with a screw. The reference numeral 93 represents an integrally formed journal adapted to rotatably support a rotary shaft 44b of the clamp 44. The above-mentioned coupling block 90 is provided with a hole 94 for connection to the air inlet pipe 70, a hole 95 for connection to the low-pressure coolant inlet pipe 71 and a hole 96 for connection to the high-pressure coolant inlet pipe 72 and each of these holes is extending to the reverse side of the coupling block 33 so that the air or the coolant may be introduced from the lower end surface of the ring gear 30. As shown in FIG. 18 which is a sectional view taken on the line D–D' of FIG. 17, a hole 100 for insertion of a piston 43 adapted to push the clamp 44 (FIG. 9) is drilled near the hole 96 for connection to the high-pressure coolant inlet pipe. Since the introduction of air and coolant into this coupling block is effected from above, e.g. via the passageways formed in the ring gear 30, for instance, instead of being done from the lateral side of the machining center, it is not necessary to extend the fluid delivery piping over a long distance as in the foregoing embodiments or provide the takeup means 57 shown in FIGS. 10 and 11 so that a compact body block such as shown in FIG. 13 can be implemented. In FIG. 13, the position of said coupling block 90 is indicated by the two dots-chain line.

FIG. 19 shows a still further embodiment of this invention.

This fluid delivery system includes a driving source block consisting of a stepping motor (hereinafter referred to briefly as the motor) 101 and a pinion gear 102 as mounted on the machining center body (not shown) and the body block carrying a downwardly extending fluid delivery pipe 103 is rotatably mounted on the tool coupling shaft 9 of the tool holder 2.

First, the driving source block is explained. The driving source block essentially comprises a housing 104, a motor 101 affixed thereto, a screw shaft 105 mounted coaxially with the motor shaft of said motor 101, and a pinion gear 102 which is meshed at right angles with said screw shaft 105. The pinion gear 102 is rotatably mounted on said housing 104 and a housing cover 104a through bearing means 111 and has above its shaft hole a large-diameter hole 102a for accepting a coupling block 106 communicating with the machining center fluid delivery passageway for supplying a grinding fluid or the like. Inserted below the shaft hole of said pinion gear 102 is a fluid delivery pipe 103 to be described later, which pipe 103 is adapted to abut the lower end surface of an inner cylinder 107 which slides within said coupling block 106. Installed overhead said inner cylinder 107 is a disk plate 109 which is upwardly pre-energized by a compression spring 108. The lower end surface 102b of said pinion gear 102 is provided a circumferentially toothed portion adapted to engage the upper end surface 110a of an upwardly extending boss of a toothed pulley 110 to be described hereinafter to form a clutch. Like the pinion gear 102, the screw shaft 105 meshing with the pinion gear 102 is also rotatably mounted on the housing 104 through bearing means (not shown).

The body block is then explained below. The body block essentially comprises an inner cylinder 113 as rotatably mounted on the tool holder 2 through bearing means 112 and having a periphery formed as a toothed pulley, a toothed pulley 110 which is connected to said inner cylinder 113 through a timing belt (not shown), a fluid delivery pipe 103 as rotatably supported in the shaft hole of said toothed pulley 110 through a bush 114, an outer cylinder 117 adapted to rotatably support said inner cylinder 113 and toothed pulley 110 through bearings 115 and 116, respectively, and a downwardly extending air pipe 119 as slidably mounted on said outer cylinder 117 through a bush 118. The fluid delivery pipe 103 mentioned above is fitting into the shaft hole of the pinion gear 102 of the driving source block. The above-mentioned toothed pulley 110 has an upwardly extending boss whose upper end surface 110a has a circumferential toothed portion adapted to engage the lower end surface 102b of said pinion gear 102 to constitute a clutch. The above-mentioned air pipe 119 is biased by a compression spring 120 disposed below so that the pipe 119 is upwardly pre-energized. Therefore, the tip of said air pipe 119 is pressing the forward end of the air supply passageway on the driving source block side. As seen from the drawings, the air fed into the body block by said air pipe 119 finds its way into the various bearings 112, 115 and 116 within the body block to prevent entry of grounds and other dusts into the bearings. The reference numeral 121 represents a stopper which engages the cutout of a partially exploded disk 122 affixed to the tool coupling shaft 9 of the tool holder 2 to thereby perform the circumferential positioning of the whole body block. Thus, upon removal of the tool holder 2 from the machining center, the above engagement is effected by the biasing force of said compression spring, while mounting of the tool holder 2 on the machining center results in disengagement to make the inner cylinder 113 freely rotatable as illustrated. The reference numeral 123 represents a jet nozzle mounting plate as integrally mounted on the lower end surface of said inner cylinder 113 and carries a couple of jet nozzles communicating with a fluid delivery passageway (formed in the outer cylinder 117 but not shown) from the fluid delivery pipe 103. The jet nozzles may be of the same type as described in connection with the earlier-described embodiments and have been omitted from the drawings.

Like the fluid delivery systems shown in FIG. 1 and elsewhere in the drawings, the fluid delivery system in this embodiment is such that the fluid can always be delivered selectively towards the machining point by driving the motor 101 in association with the progress of machining operation by the machining center. Particularly, this fluid delivery system differs from the fluid delivery systems shown in FIG. 1 and elsewhere in that the body block attached to the tool holder 2 is not rotated as a whole but only the jet nozzle mounting plate disposed at the lower end of the body block spins together with the inner cylinder 113 built into the body block, offering the advantage that there is no waste in the action of orienting the nozzles and the direction of fluid delivery can be more accurately controlled FIG. 20 shows a modification of the above embodiment. Thus, this fluid delivery system features a parallel connection between the motor 101 of the driving source block and the fluid delivery pipe 103 of the body block by means of a combination of two gears 124 and 125. The shaft hole of the gear 125 is formed with an axially extending key-groove 125a, while the top of the fluid delivery pipe 103 is formed with a projection 103a engageable with said key-groove 125a. And in the condition that the tool holder 2 has been mounted on the machining center (not shown) as in the illustration, as the fluid delivery pipe 103 fits into said gear 125, the groove 125a engages the projection 103a at the same time so that the rotary driving force of the motor 101 is transmitted to the fluid delivery pipe 103. The other structural features are similar to those of the embodiment shown in FIG. 19 and the like numerals are used to denote the like parts.

This fluid delivery system also produces the same effect as the fluid delivery system illustrated in FIG. 19.

I claim:

1. A machining center fluid delivery system comprising a body block to be mounted on a tool holder mounted on a machining center and a driving source block to be mounted on a body of the machining center for rotating said body block; said driving source block including a ring gear to be rotatably, circumferentially mounted at a lower end opening of an outer cylinder of a spindle of the machining center, a fluid delivery pipe coupling means fixed to a lower surface of said ring gear, and a fluid delivery passageway communicating at one end thereof to a fluid delivery source outside of the machining center and at the other end thereof to said fluid delivery pipe coupling means; said body block comprising a cover-shaped body member mountable relatively rotatable on a toll coupling shaft of the tool holder and including an upper portion and a lower circumferential axially extending portion, at least one fluid delivery nozzle extending from said lower portion, and a fluid delivery pipe extending upwardly from said upper portion and having one end thereof communicating with a base end of said at least one fluid delivery nozzle and an upper tip end thereof engaged with said fluid delivery pipe coupling means on said ring gear; whereby when said ring gear is turned, said body member is also turned about an axis of the spindle to direct fluid flow from said at least one fluid delivery nozzle to a desired position.

2. A machining center equipped with a fluid delivery system, said machining center including a body, a spindle rotatably mounted in said body and having an outer cylinder with a lower end opening, and a tool holder releasably mounted to said spindle and having a tool coupling shaft; said fluid delivery system comprising a body block mounted on said tool holder and a driving source block mounted on said body for rotating said body block, said driving source block including a ring gear rotatably, circumferentially mounted on said lower end opening of said outer cylinder of said spindle, a fluid delivery pipe coupling means fixed to a lower surface of said ring gear, and a fluid delivery passageway communicating at one end thereof to a fluid delivery source outside of said machining center and at the other end thereof to said fluid delivery pipe coupling means, said body block comprising a cover-shaped body member mounted to be relatively rotatable on said tool coupling shaft and including an upper portion and a lower circumferential axially extending portion, at least one fluid delivery nozzle extending from said lower portion, and a fluid delivery pipe extending upwardly from said upper portion and having one end thereof communicating with a base end of said at least one fluid delivery nozzle and an upper tip end thereof engaged with said fluid delivery pipe coupling means; whereby when said ring gear is turned, said body member is also turned about an axis of said tool holder to direct fluid flow from said at least one fluid delivery nozzle to a desired position.

* * * * *

UNITED STATES PATENT AND TRADEMARK OFFICE
CERTIFICATE OF CORRECTION

PATENT NO. : 4,822,218

DATED : April 18, 1989

INVENTOR(S) : Yoshikazu SATOH

It is certified that error appears in the above-identified patent and that said Letters Patent is hereby corrected as shown below:

Drawing Sheet 4 of 15, "FIG. (b)" should read --FIG. 7(b)--.

Column 3, line 45, "EFFECT" should read --EFFECTS--;
    lines 47 and 48, "according that" should read
  --according to this invention produces an unparalleled
  effect in that--;
    line 62, "enhanced" should read --enhanced.--.

Column 10, line 22, "shown n" should read --shown in--.

Column 13, line 18, "controlled" should read --controlled.--.

Column 14, line 5, "toll" should read --tool--.

Signed and Sealed this

Twenty-third Day of October, 1990

*Attest:*

HARRY F. MANBECK, JR.

*Attesting Officer*   *Commissioner of Patents and Trademarks*